United States Patent
Malsbury et al.

(10) Patent No.: US 6,223,925 B1
(45) Date of Patent: May 1, 2001

(54) STUD TENSIONING DEVICE FOR FLANGE COVER

(75) Inventors: Allen S. Malsbury, Parsippany, NJ (US); Ronald T. Myszka, Bethlehem; Joseph Kalinosky, Allentown, both of PA (US); Richard Klick, Bedminster, NJ (US)

(73) Assignee: Foster Wheeler Corporation, Clinton, NJ (US)

( * ) Notice: Subject to any disclaimer, the term of this patent is extended or adjusted under 35 U.S.C. 154(b) by 0 days.

(21) Appl. No.: 09/298,060

(22) Filed: Apr. 22, 1999

(51) Int. Cl.$^7$ ................................................. B65D 45/00
(52) U.S. Cl. ........................ 220/328; 220/263; 292/138; 81/57; 81/38
(58) Field of Search ................ 29/252, 428; 202/245; 220/315, 328, 327, 260, 263, 264; 284/97; 92/7; 414/684, 3; 292/138, 164; 49/149, 324; 81/57, 38

(56) References Cited

U.S. PATENT DOCUMENTS

| | | |
|---|---|---|
| 1,055,629 | 3/1913 | Grant et al. . |
| 2,734,824 | 2/1956 | DeLuca ................................... 92/7 |
| 2,866,370 | 12/1958 | Biach . |
| 3,379,623 * | 4/1968 | Forsyth . |
| 3,774,787 | 11/1973 | Ledinsky ............................ 214/35 R |
| 3,835,523 | 9/1974 | Stansfield . |
| 3,855,798 | 12/1974 | Spairani . |
| 3,860,491 | 1/1975 | Baird et al. ......................... 202/161 |
| 3,917,224 | 11/1975 | Stansfield et al. . |
| 4,086,231 | 4/1978 | Ikio ..................................... 202/248 |
| 4,222,590 * | 9/1980 | Regan ................................... 285/14 |
| 4,295,773 | 10/1981 | Dhondt ................................. 414/187 |
| 4,726,109 | 2/1988 | Malsbury et al. ................ 29/402.08 |
| 4,820,384 | 4/1989 | Pechacek ............................. 202/245 |
| 4,952,284 | 8/1990 | Becker ................................. 202/248 |
| 4,960,358 | 10/1990 | DiGiacomo et al. ............. 414/684.3 |
| 5,048,876 | 9/1991 | Wallskog ............................. 285/364 |
| 5,098,132 * | 3/1992 | Burton ................................... 285/18 |
| 5,221,019 | 6/1993 | Pechacek et al. .................... 220/315 |
| 5,228,825 | 7/1993 | Fruchtbaum et al. ............ 414/684.3 |
| 5,290,072 | 3/1994 | Pechacek ............................. 285/97 |
| 5,336,375 | 8/1994 | Wallskog et al. .................... 202/96 |
| 5,445,469 | 8/1995 | Huck et al. ............................ 403/30 |
| 5,500,094 | 3/1996 | Fruchtbaum et al. .............. 202/241 |
| 5,556,515 | 9/1996 | Giunta et al. ........................ 202/248 |

FOREIGN PATENT DOCUMENTS

| | | |
|---|---|---|
| 1 874 985 | 7/1963 | (DE) . |
| 93/19315 | 9/1993 | (WO) . |

OTHER PUBLICATIONS

Translation of German Patent Document No. 1 874 985.

* cited by examiner

Primary Examiner—S. Thomas Hughes
Assistant Examiner—John C. Hong
(74) Attorney, Agent, or Firm—Fitzpatrick, Cella, Harper & Scinto (57) ABSTRACT

A mechanism for selectively securing a cover to a flange of a pressure vessel. A plurality of such devices can be employed, using a plurality of studs that extend through matching openings in the flange and cover. A movable anchor plate or plates, also with holes through which each stud extends, is disposed adjacent to the flange or cover. The head of each stud will fit through its associated hole of the anchor plate (and into the opening of the closer one of the flange or cover) only if the anchor plate is properly oriented. When the anchor plate is so oriented, a piston head at the opposite end of the stud can be actuated away from the flange and cover to retract the stud head into the opening of the flange or cover. This protects the stud when the cover is disengaged from the flange. The stud can be biased in the opposite direction to permit the anchor plate to be reoriented into a position in which the stud head cannot pass through the anchor plate, so the stud can clamp the flange and cover together.

31 Claims, 10 Drawing Sheets

| BOTH LATCHING CONTROL VALVES SHALL BE ELECTRICALLY LOCKED-OUT UNTIL THE FOLLOWING IS TRUE: | |
|---|---|
| INLET & OUTLET SPx VALVES | CLOSED |
| SWITCH VALVE | SWITCHED |
| TOP HEAD | OPEN |
| DRUM TEMPERATURE | LOW |
| DRUM PRESSURE | LOW |
| CLAMPING PRESSURE | HIGH |

STUD TENSIONING DEVICE FOR FLANGE COVER

FIELD OF THE INVENTION

This invention relates to pressure vessels, and more particularly, relates to a stud tensioning device for securing a cover to a flange of such a vessel.

BACKGROUND OF THE INVENTION

Many industrial processes, such as coking processes or chemical treatment processes, employ large pressure vessels, often disposed vertically with top and bottom closure mechanisms. The bottom closure usually includes a cover that is generally quite massive and secured to the vessel by dozens of bolts. In order to remove the bottom cover from the vessel (a process sometimes referred to as "unheading" the vessel), the bottom cover is generally first supported by a hydraulic lifting mechanism, then disengaged from the vessel, at which point it can be lowered by the hydraulic mechanism. The operation is reversed to resecure the cover in place. The disengagement and reengagement of the bottom closure can be quite labor intensive, given the mass of the bottom cover and the numerous bolts that hold it in place.

Examples of removable closures are shown in U.S. Pat. Nos. 4,820,384 and 5,290,072, each to Pechacek, and U.S. Pat. No. 5,221,019, to Pechacek et al. For example, the Pechacek '384 patent discloses a remotely operable vessel cover assembly including a cover 10, which can be attached to a flange 5 surrounding an opening in the vessel. When the cover 10 is raised into position, a series of connector pins 60 fits through corresponding holes 20f in a force ring 20 and keyhole-shaped holes 30a in a lock ring 30, which is rotated so that heads 60e of the connector pins 60 are locked behind the lock ring 30. Fluid pressure is then applied to a force actuator 40, pressurizing inner and outer annular rings 40a, 40b, which expand to pre-stress the pins 60 and the cover 10. A ramp ring 50 is then rotated until a series of ramps 50a firmly contacts a complementary series of ramps 10b on the cover 10. The force actuator 40 is then depressurized. According to the Pechacek '384 patent, the angle of inclination of the ramps 50a is sufficiently shallow that friction between the ramp ring 50 and the cover 10 prevents slippage.

The Pechacek '384 patent shows a mechanism for facilitating engagement and removal of the cover 10. Rather than individually tightening and loosening a large number of bolts, connector pins 60 are selectively locked behind a locking ring 30. However, the mechanism disclosed in the '384 patent is complex. For example, in order to secure the cover 10, the mechanism requires first setting the lock ring 30 in position behind unstressed pins 60, then stressing the pins 60 by means of a complex pressure ring assembly, and then utilizing a separate ramp ring 50 to support the pins 60 once they are stressed. Further, as can be seen in FIG. 1 thereof, when the cover 10 is brought into or out of engagement with the vessel, the pins 60 are exposed so as to be susceptible to damage due to contact with the cover 10.

Another example, U.S. Pat. No. 5,228,825, to Fruchtbaum et al., discloses a pressure vessel closure device in which a vessel V is equipped with a head assembly A, which includes a lower flange F at an opening into the vessel V. A generally circular bottom head H (blind flange) is secured against the flange F for sealing the vessel V with a suitable gasket. In normal use, the vessel V is sealed by a plurality of springs 14 and hooks 12. The hooks 12 anchor a movable retaining element 10 to the bottom head H. The springs 14 bias the retaining element 10 away from the flange F to tension the hooks 12 to seal the bottom head H against the flange F.

In the '825 patent, a plurality of cylinders 30 is disposed to draw the movable retaining element 10 downwardly toward the flange F. Before the bottom head H is attached, the hooks 12 are spread, as shown in FIG. 7 of that patent. The cylinders 30 are pressurized to compress the springs 14, the bottom head H is raised to engage the flange F, and the hooks 12 are then pivoted inwardly below forks 36. The cylinders 30 are depressurized, and the springs 14 then bias the retaining element 10 upwardly from the flange F, and the hooks 12, in turn, engage the forks 36 and securely hold the bottom head H in place against the flange F.

Rather than using traditional bolts or pins, the device of the '825 patent utilizes hooks and forks in combination with an axially movable retaining element. The described device also requires that each of the hooks be pivoted in order to engage them behind or disengage them from the forks.

Similarly, U.S. Pat. No. 2,734,824, to DeLuca, shows an autoclave or pressure vessel that includes a vertically disposed tank 10 having a bottom cover. A plurality of bolts 46 is spaced about the tank 10 and arranged to engage a cover 13 when the cover 13 is closed. Each bolt 46 is threadably secured at its upper end to a bifurcated member 47 and has a shoulder 48 which rests tightly against the lower surface of the member 47. Corresponding to each bolt is a radial slot 61' in the edge of the cover and a slot 61 in a flange 65 of the tank 10. The lower end of each bolt 46 is provided with a nut 59 and washer 60 to engage the underside of the cover 13. Cylinders 49 function to move their respective bolts downwardly, and a series of cams 56 cooperates to swing the bolts outwardly to disengage the bolts from the cover and flange to permit opening of the cover 13.

The bolts 46 in the '824 patent, while providing the basic means for holding the cover 13 in position, would not, according to that patent, prevent accidental opening of the cover 13 should the hydraulic pressure on cylinders 49 fail. In order to avoid such an occurrence, a locking ring 64 is provided on top of the flange 65. The upper shoulder 48 of each bolt 46 is spaced slightly above the top surface of the locking ring 64 when the cover 13 is locked closed. The ring 64 has a plurality of rectangularly shaped cut-out portions 66, and one edge of each of these cut-out portions 66 is provided with a narrow slot 67. The ring 64 can be rotated to a locked position in which the slot 67 engages the body of the bolt 46 and is aligned with its upper collar 48, as shown in FIGS. 4 and 5 of the '824 patent. On the other hand, each member 47 may be aligned with its associated cut-out portion 66 when the cover 13 is to be opened.

The apparatus shown in the '824 patent utilizes a relatively complex mechanism that requires the bolts 46 to be pivoted to be seated and unseated. Further, the same hydraulics that actuate the pivoting must also bear the downward force on the bolts when the tank is sealed. Thus, the locking ring must be employed separately to guard against accidental opening in the event of hydraulic failure.

Thus, there is a need in the art for a mechanism that selectively and reliably secures a cover to a flange of a pressure vessel, which can be simply and efficiently engaged and disengaged. There is a further need for such a mechanism that is conducive to remote actuation. There is a still further need for such a mechanism that does not rely on hydraulic pressure to maintain the engagement. There is an additional need in the art for a mechanism that utilizes bolts or studs to selectively secure a cover to a flange of a pressure vessel, wherein the bolts or studs can be retracted when the cover is disengaged from the flange.

SUMMARY OF THE INVENTION

Our invention addresses the foregoing needs in the art by providing a stud tensioning device that selectively secures a cover to a flange of a pressure vessel. A plurality of such devices can be employed, using a plurality of studs that extend through matching openings in the flange and cover. A movable anchor plate or plates, also with holes through which each stud extends, is disposed adjacent to the flange or cover. The head of each stud will fit through its associated hole of the anchor plate (and into the opening of the closer one of the flange or cover) only if the anchor plate is properly oriented. When the anchor plate is so oriented, a piston head at the opposite end of the stud can be actuated away from the flange and cover to retract the stud head into the opening of the flange or cover. This protects the stud when the cover is disengaged from the flange. The stud can be biased in the opposite direction to permit the anchor plate to be reoriented into a position in which the stud head cannot pass through the anchor plate, so the stud can clamp the flange and cover together.

Each aspect of this invention relates to a mechanism for selectively securing a cover to a flange of a pressure vessel, the cover and flange each having at least one opening therethrough, the respective openings being aligned when the cover is properly positioned facing the flange.

In one aspect of the invention, the mechanism includes a stud extending through the opening of one of the flange and the cover. The stud has a stud head at one end and a piston head at the other end, the stud head being sized to fit longitudinally through the opening of the other of the flange and the cover. A selectively movable anchor plate is disposed opposite to the other of the flange and the cover from the one of the flange and the cover. The anchor plate has a hole through which the stud can extend when the cover is positioned facing the flange, the hole having (i) a wider portion through which the stud head can pass longitudinally and (ii) a narrower portion through which the stud head cannot pass longitudinally. The anchor plate is movable between a first position, in which the narrower portion of the hole is aligned with the openings of the cover and flange, and a second position, in which the wider portion of the hole is aligned with the openings of the cover and flange. A cylinder is provided in which the piston head is mounted so as to be slidable substantially normal to the one of the flange and the cover, the cylinder being mounted opposite to the cover and the flange from the anchor plate and including a mechanical stop that limits movement of the piston head relative to the cylinder in a direction toward the anchor plate. The cylinder is selectively movable relative to the anchor plate in a direction away from the anchor plate, when the anchor plate is in the first position and the piston head is against the mechanical stop, so as to draw the stud head against the anchor plate to clamp the cover and the flange together. The piston head is selectively movable away from the mechanical stop, when the anchor plate is in the second position, so as to retract the stud head into the opening of the other of the flange and the cover.

In another aspect, the mechanism includes a hydraulic cylinder mounted to one of the cover and the flange opposite from the other of the cover and the flange. A piston is mounted for slidable movement within the hydraulic cylinder in a direction substantially normal to the one of the cover and the flange. The piston has an axial bore aligned with the opening of the one of the cover and the flange and is movable between a locking position and an unlocking position, the locking position being farther from the one of the cover and the flange than is the unlocking position. A stud extends through the opening of the one of the cover and the flange and has a stud head at one end and a piston head at the other end. The piston head is mounted for slidable movement within the axial bore of the piston between an extended position and a retracted position relative to the piston, the extended position being closer to the one of the cover and the flange than is the retracted position. An anchor plate is disposed opposite to the other of the cover and the flange from the cylinder. The anchor plate has a hole therethrough, and the hole has a wider portion and a narrower portion, the wider portion being sized so that the stud head can pass therethrough, and the narrower portion being sized so that the stud head cannot pass therethrough. The anchor plate is movable relative to the other of the cover and the flange so that the wider and narrower portions of the hole are alternately alignable with the opening of the other of the cover and the flange. When the piston head is in the extended position, (i) the stud can extend through the openings of the cover and flange and through the hole of the anchor plate with the stud head spaced from the anchor plate if the piston is in the unlocking position, and (ii) the stud can extend through the openings of the cover and flange and through the hole of the anchor plate with the stud head clamped against the anchor plate if the piston is biased toward the locking position and the narrower portion of the hole is aligned with the opening of the flange.

In yet another aspect, the mechanism includes an anchor plate movably disposed adjacent to one of the cover and the flange. The anchor plate has a hole therethrough, and the hole has a wider portion and a narrower portion. The anchor plate is movable between a first position, in which the narrower portion of the hole is aligned with the openings of the cover and the flange, and a second position, in which the wider portion of the hole is aligned with the openings of the cover and the flange. At least one piston is secured to the other of the cover and the flange so as to be slidable in a direction substantially normal to the other of the cover and the flange in alignment with the opening therethrough. A piston head is mounted for slidable movement relative to the piston. A stud extends from the piston head and through the opening of the other of the cover and the flange, the stud having a stud head remote from the piston head so that the stud head is positionable on an opposite side of the flange and the cover from the piston when the cover is in position facing the flange. The stud head is sized to fit longitudinally through the opening of the one of the cover and the flange and through the wider portion of the hole of the anchor plate, but the stud head is sized not to fit longitudinally through the narrower portion of the hole of the anchor plate. A resilient member biases the piston away from the other of the cover and the flange so as to bias the stud head toward the one of the cover and the flange. A first selectively activated actuator overcomes the bias of the resilient member to force the piston toward the other of the cover and the flange and to force the piston head toward the other of the cover and the flange relative to the piston. A second selectively activated actuator biases the piston head away from the other of the cover and the flange relative to the piston. With the anchor plate in the first position and the stud head opposite to the anchor plate from the piston, deactivating the first actuator permits the resilient member to bias the stud head against the anchor plate to clamp the cover and flange together. With the anchor plate in the second position, deactivating the first actuator and activating the second actuator retracts the stud head through the wider portion of the anchor plate hole and into the opening of the one of the cover and the flange so that the cover and the flange can be separated.

In a still further aspect, the mechanism includes a stud extending through the opening of one of the cover and the flange. The stud has a stud head at one end and a piston head at the other end, and the stud head is sized to fit longitudinally through the opening of other of the cover and flange. At least one piston is mounted to the one of the cover and flange for slidable movement in a direction substantially normal to the one of the cover and flange. The piston head of the stud is mounted for slidable movement within the piston in the direction of the movement of the piston. The stud head and the piston are positionable on opposite sides of the cover and flange when the cover is positioned facing the flange. An anchor plate is disposed opposite to the cover and flange from the piston and has a hole therethrough into which the stud can extend when the cover is positioned facing the flange. The hole has (i) a wider portion through which the stud head can pass longitudinally and (ii) a narrower portion through which the stud head cannot pass longitudinally. The anchor plate is movable between a first position, in which the narrower portion of the hole is aligned with the openings of the cover and flange, and a second position, in which the wider portion of the hole is aligned with the openings of the cover and flange. A resilient member biases the piston away from the cover and flange. A selectively activated first actuator overcomes the bias of the resilient member to force the piston toward the cover and flange and to force the piston head toward the cover and flange relative to the piston. A second selectively activated actuator biases the piston head away from the cover and flange relative to the piston. When the anchor plate is in the first position, deactivating the first actuator permits the resilient member to bias the stud head against the anchor plate to clamp the cover and flange together. When the anchor plate is in the second position, deactivating the first actuator and activating the second actuator draws the stud head through the wider portion of the anchor plate hole and into the opening of the other of the cover and flange so that the cover and flange can be separated.

These and other objects, features and advantages of the present invention will be more clearly understood from the following discussion with reference to the following drawings, in which like reference numerals refer to like elements throughout.

DETAILED DESCRIPTION OF THE PREFERRED EMBODIMENTS

Figure 1A:
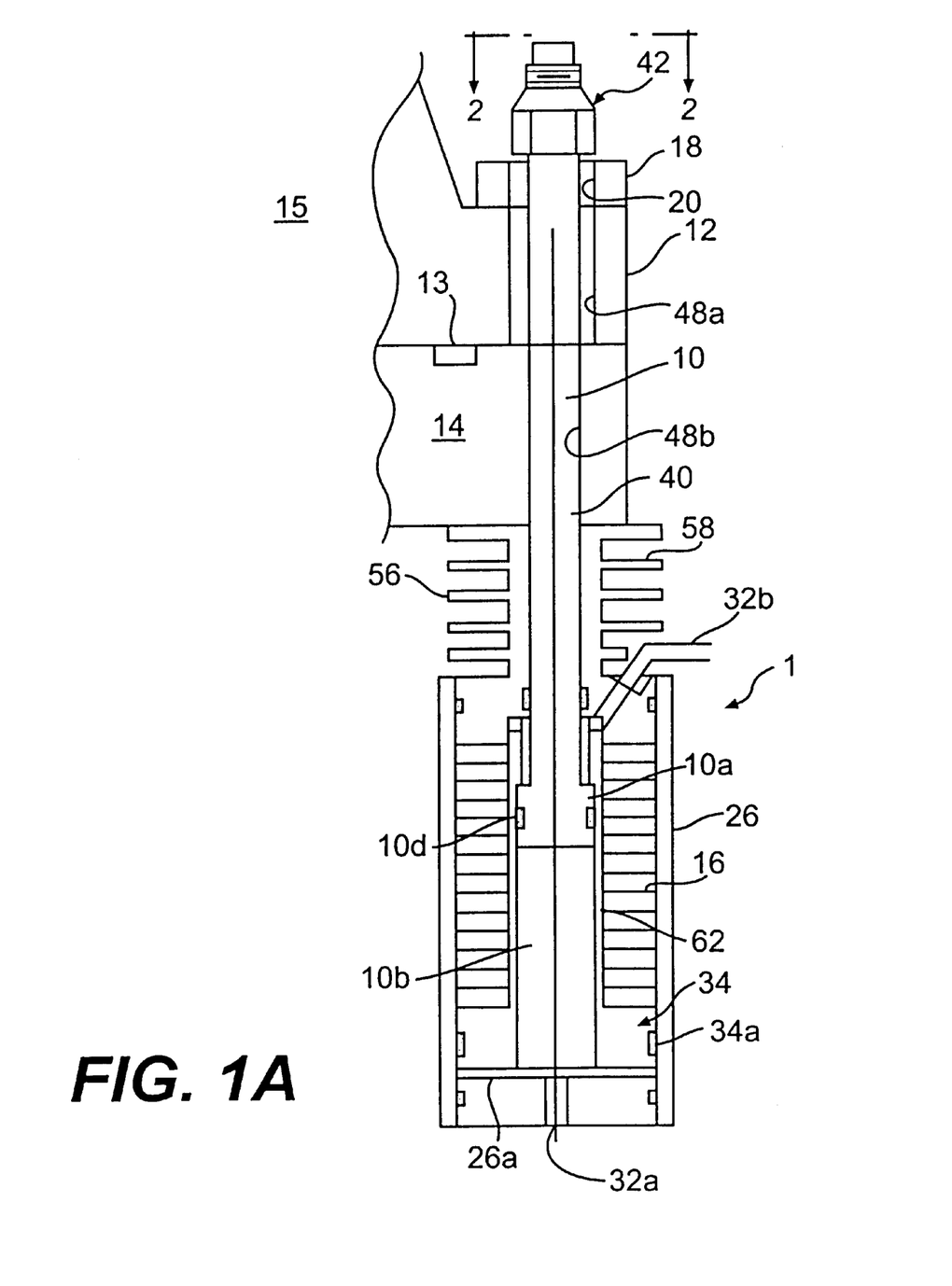
FIGS. 1A and 1B are schematic, elevational views in partial cross section of a flange cover closure mechanism according to an embodiment of the present invention.
Figure 1B:
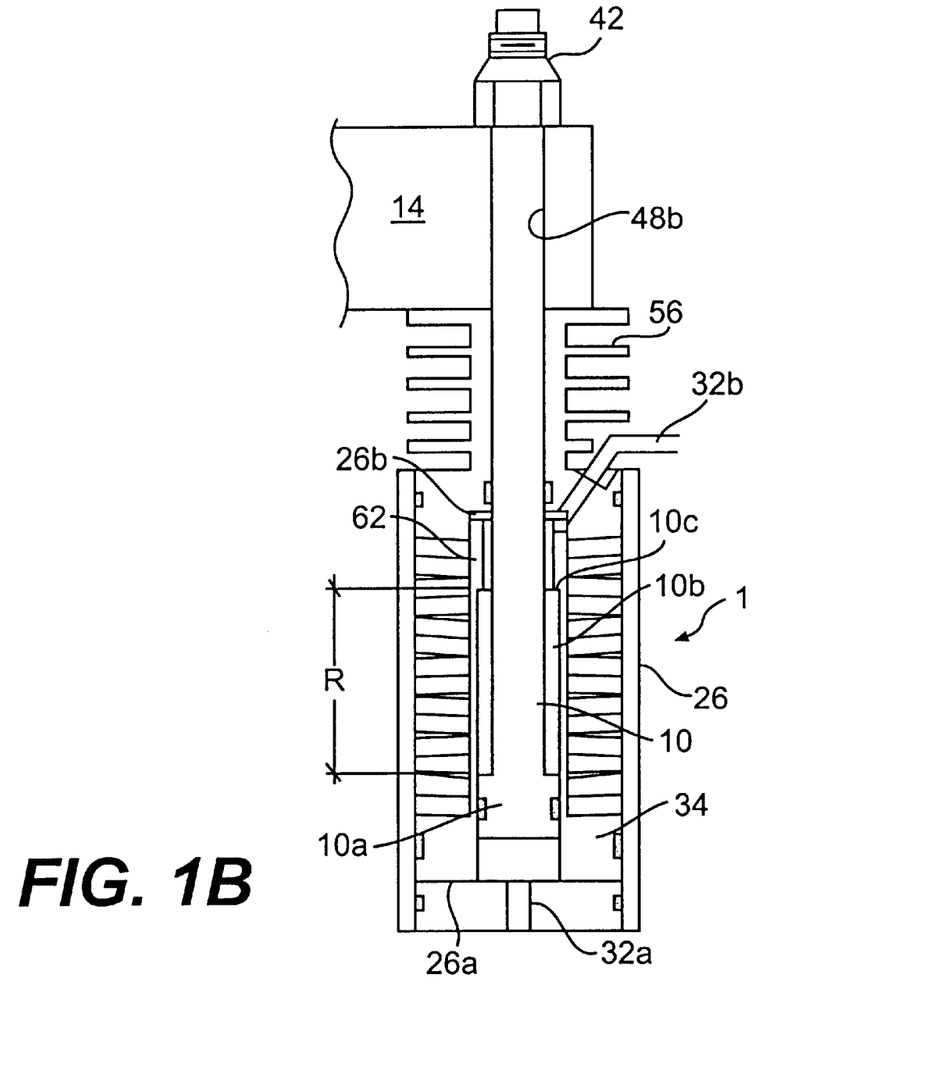

FIGS. 1A and 1B schematically illustrate a flange cover closure mechanism 1, for closing an opening of a pressure vessel 15, according to an embodiment of the present invention. Many features of the closure mechanism of this embodiment are disclosed in copending U.S. patent application Ser. No. 09/170,191, which is incorporated herein by reference.

Around the opening of the pressure vessel 15 is a flange 12 with which a cover 14 mates. Preferably, a gasket 13 seats between the flange 12 and the cover 14. The flange 12 and the cover 14 have matching longitudinal openings 48a, 48b, which align when the cover 14 is in position facing the flange 12. A stud 10 extends longitudinally through the matching openings 48a, 48b to hold the flange 12 and the cover 14 together as described below.

The stud 10 has a shank 40 with a head 42 at one end thereof. The head 42, which can be either secured to the stud 10 or integrally formed therewith, is larger than the shank 40 in cross section, but small enough to fit through the opening 48a or 48b of at least one of the flange 12 and the cover 14, as discussed in more detail below. Preferably, the head 42 is a hex nut, or the like, which is threaded onto the stud 10. This provides a convenient means for making fine adjustments to the location of the head 42 relative to the other elements of the mechanism 1. A piston head 10a is located at the other end of the shank 40 of the stud 10. The piston head 10a can be either secured to the stud 10 or integrally formed therewith. The stud head 42 and the piston head 10a are positionable, as shown in FIG. 1A, on opposite sides of the flange 12 and the cover 14.

In the illustrated embodiment, the piston head 10a is slidably mounted within a cylinder 10b, which in turn is formed by a longitudinal bore in a piston 34. The piston 34 is also positionable, as shown, on opposite sides of the flange 12 and the cover 14 from the stud head 42.

The range of motion R of the piston head 10a is limited relative to the piston 34 at one end by a mechanical stop, such as a shoulder 10c that is formed in the cylinder 10b. The shoulder 10c is formed at the constriction from a wider portion of the cylinder 10b (in which the piston head 10a resides) to a narrower portion of the cylinder 10b (through which the stud shank 40 extends). The range of motion R of the piston 10a in the other direction is limited by the stud head 42, as discussed later.

The piston 34 in the illustrated embodiment is slidably disposed in an outer hydraulic cylinder 26, which is secured to the underside of the cover 14. The outer cylinder 26 can be mounted to the cover 14 by a conventional mounting bracket and bolts (not shown in FIGS. 1A and 1B), or the like. The piston head 10a, piston 34 and outer cylinder 26 are each preferably formed of a relatively high-strength material such as a low alloy carbon steel. Other suitable materials, such as stainless steel or other high alloy steels, well known in the art, can be substituted as desired.

A resilient member 16 biases the piston 34 longitudinally away from the flange 12 and the cover 14, so that the stud head 42 is biased toward the flange and cover. The motion of the piston 34 in this direction is limited by the distal end 26a of the outer cylinder 26. In the illustrated embodiment, the resilient member 16 is a spring washer or spring washers disposed within the outer cylinder 26 between the piston 34 and the cover 14 so that the stud 10 extends therethrough.

In this embodiment, the mechanism 1 is shown with the stud 10 having the stud head 42 oriented toward the flange 12 and the piston 34 mounted in a cylinder 26 that is mounted to the cover 14. If desired, this arrangement can be reversed, with the piston 34 being slidably mounted to the flange 12 and the stud head 42 toward the cover 14. However, in applications such as coke drum closures, the temperatures near the drum can be quite high. Therefore, if the arrangement were reversed, measures might be necessary to buffer the hydraulic components and the resilient member 16 from the high temperatures.

Regardless of the orientation, the stud head 42 should be sized to fit through the opening 48a or 48b of the one of the flange 12 and the cover 14 that is closer to the stud head 42 (the opening 48a of the flange 12 in the embodiment shown in the figures). An anchor plate 18 is disposed opposite to the flange 12 and the cover 14 from the piston 34. The anchor plate 18, which is movable relative to the flange 12 and the cover 14, has a hole 20 through which the stud 10 extends. The hole 20 includes at least two different-sized regions that are alternately alignable with the openings 48a, 48b of the flange and cover: a narrowed portion 44, through which the stud head 42 cannot fit longitudinally, and an enlarged portion 46, through which the stud head 42 can fit longitudinally. The hole 20 can be shaped in any of several ways. In the embodiment shown in FIG. 2, the hole 20 is key-hole shaped, with a generally circular enlarged portion 46 and a contiguous, elongated narrowed portion 44.

A heat sink spacer 56 may be employed between the cover 14 and the outer cylinder 26 (or between the flange 12 and the outer cylinder 26, if the orientation of the stud 10 were reversed) of this embodiment. At times during a delayed coking cycle, for example, the cover 14 will reach relatively high temperatures. By employing this heat sink spacer 56, the resilient member 16 and the hydraulic components can be maintained within acceptable temperature ranges. The heat sink spacer 56 may be integrally formed with the outer cylinder 26 or may be provided as a separate part. It is preferred that the heat sink spacer 56 be formed of an alloy steel (similar to that normally utilized in coke drum blind covers) to provide adequate strength at high temperatures, but other suitable materials, such as low alloy carbon steel or cast iron, may be employed. In this embodiment, the heat sink spacer 56 employs fins 58 to increase surface area and to better dissipate heat. These fins 58 may be arranged longitudinally, circumferentially, or otherwise, or may be omitted altogether.

Extending from the piston 34 is a guide-and-stop 62 (hereinafter "guide"). In this embodiment, this element 62 encases and defines a large portion of the cylinder 10b in which the piston head 10a of the stud slides and also guides the spring washers 16 as the piston 34 is actuated. The length of the guide 62 in the longitudinal direction can be selected in order to define the upper limit of movement of the piston 34. As it moves toward the cover 14, the piston 34 will stop when the guide 62 abuts the proximal (upper) end 26b of the outer hydraulic cylinder 26. This limits the degree by which the resilient member 16 can be compressed in each cycle. As will be appreciated by those skilled in the art, this helps to protect the resilient member 16 against early failure due to repeated high-amplitude compressions.

The guide 62 can be either integrally formed with or affixed to the piston 34. If formed separately, the guide should be formed of a material such as a low alloy carbon steel, which is fairly high in strength. Many other such materials, such as stainless steel or other high alloy steels, can be used instead. Other materials that are commonly used in machinery design applications, such as cast iron, can be used, but the inner surface of the cylinder 10b should be formed of a material that is suitable as a bearing surface for the piston head 10a.

In the illustrated embodiment, a seal 34a on the periphery of the piston 34 provides a sealed, slidable fit with the interior of the outer cylinder 26. Similarly, a seal 10d provides a sealed, slidable fit with the cylinder 10b formed in the interior of the guide 62. Of course, if desired, more or fewer seals can be employed.

Figure 2:
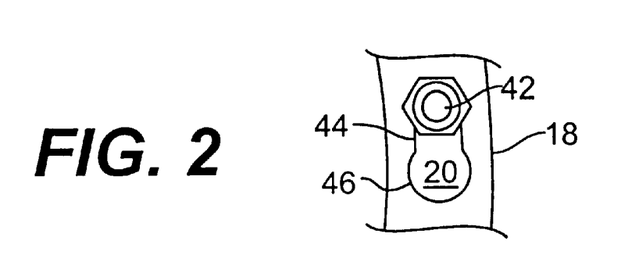
FIG. 2 is a schematic view taken along the line 2—2 in FIG. 1A.

FIG. 2 shows the anchor plate 18 in a position in which the narrowed portion 44 of the hole 20 is aligned with the stud head 42 and the matching openings, 48a, 48b of the flange 12 and the cover 14. The portion of the anchor plate 18 surrounding the narrowed portion 44 of the hole 20 therefore provides a bearing surface for the stud head 42. The anchor plate 18 can be moved so that the enlarged portion 46 of the hole 20 is instead aligned with the stud head 42 and the matching openings 48a, 48b of the flange 12 and the cover 14.

In the illustrated embodiment, both pistons 34, 10a are actuated in the same direction (toward the cover) by introducing pressurized hydraulic fluid into the outer cylinder 26 through a port 32a at the distal side of the piston 34. Another hydraulic port 32b is provided for actuation of the piston head 10a away from the shoulder 10c of the cylinder 10b.

Introducing pressurized hydraulic fluid through port 32a drives the piston 34 toward the flange 12 and the cover 14, against the bias of the resilient member 16—the spring washer, in this embodiment, which is compressed by the piston 34. This also drives the piston 10a toward the shoulder 10c of the cylinder 10b (i.e., closer to the flange 12 and the cover 14). This extends the stud 10 and the head 42 away from the flange 12 and the cover 14, so that the head 42 is clear of the anchor plate 18, as shown in FIG. 1A. When the stud head 42 is so positioned, the anchor plate 18 can be moved relative to the cover 14 and the flange 12. The range of motion of the anchor plate 18 is constrained by the presence of the stud shank 40 within the hole 20.

When the piston 34 is permitted to return under the bias of the resilient member 16 (i.e., when no pressurized hydraulic fluid is introduced through the port 32a) with the anchor plate in the position illustrated in FIG. 2, the mechanism 1 acts to clamp the flange 12 and the cover 14 together. Because the anchor plate 18 is positioned so that the narrow portion 44 of the hole 20 is aligned with the openings 48a, 48b, the stud head 42 cannot pass through the hole 20. As the resilient member 16 forces the piston 34 away from the flange 12 and the cover 14, the piston head 10a will be forced in the same direction by the shoulder 10c in the cylinder 10b. The stud head 42 will, in turn, abut the anchor plate 18, preventing the piston 34 from being moved any further away from the anchor plate 18. Thus, the force of the resilient member 16 will clamp the flange 12 and the cover 14 together, compressing the gasket 13 therebetween.

On the other hand, when the piston 34 is permitted to return when the enlarged portion 46 of the hole 20 of the anchor plate 18 is aligned with the stud head 42, the resilient member 16 biases the piston 34 against the distal end 26a of the outer cylinder 26. The piston 34 draws the stud head into the enlarged portion 46 of the hole. At this point, there is no obstruction to passing the stud head 42 through the opening 48a of the flange 12 so that the flange 12 and the cover 14 can be separated. Preferably before this is done, fluid can be introduced via port 32b to bias the piston head 10a away from the cover 14. This will draw the stud head 42 through the opening 48a of the flange 12.

FIG. 1B illustrates the present embodiment of the inventive closure mechanism with the stud 10 in its retracted position. The cover 14 has been separated from the flange of the vessel (the figure omits showing the flange and anchor plate), and the stud 10 has been retracted into the cover 14 and outer cylinder 26. The piston 34 is against the distal (lower) end 26a of the outer cylinder 26, and the piston head 10a has moved away from the shoulder 10c so that the stud head 42 has come into contact with the cover 14.

Preferably, the range of motion of the piston head 10a is limited in this direction (away from the cover) by the lengths of the stud 10 and the cylinder 10b of the piston 34. These respective lengths should be chosen so that the stud 10 will continue to move in this direction until the stud head 42 abuts the cover 14 at the opening 48b. With this arrangement, the stud 10 can retract almost entirely into the cover 14 and the outer cylinder 26, with only the portion of the stud 10 beyond and including the stud head 42 being exposed, as shown in FIG. 1B. Thus, the stud 10 is protected when the cover 14 is removed from the flange 12. In the preferred embodiment, the outer cylinder 26 needs to be charged via port 32b for only a brief interval. Once the stud 10 is retracted, it should remain retracted until extended by the introduction of pressurized fluid via port 32a.

Figure 3:
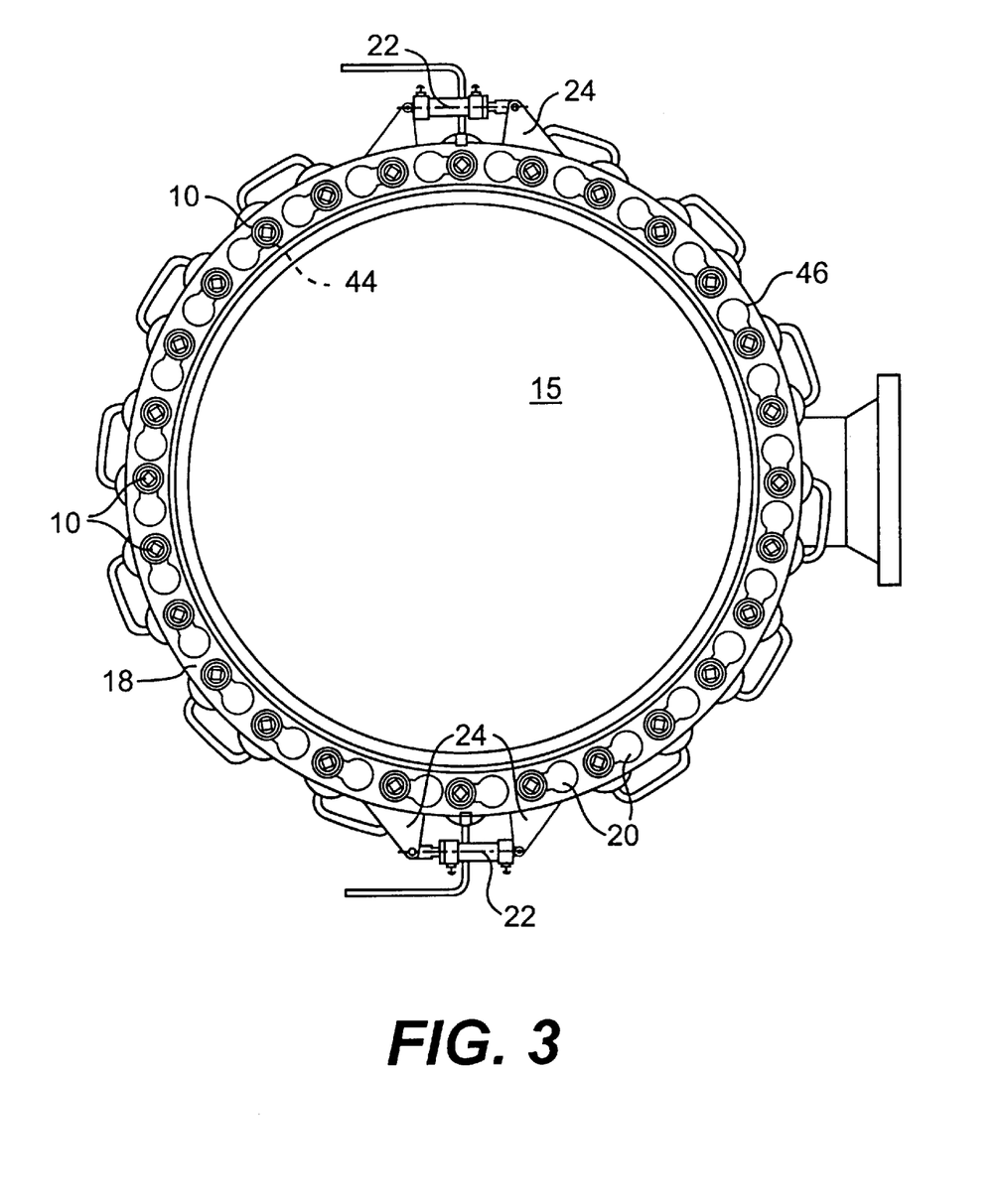
FIG. 3 is a top schematic sectional view of the lower end of a coke drum employing a plurality of flange cover closure mechanisms similar to the mechanism shown in FIG. 1A.
Figure 4:
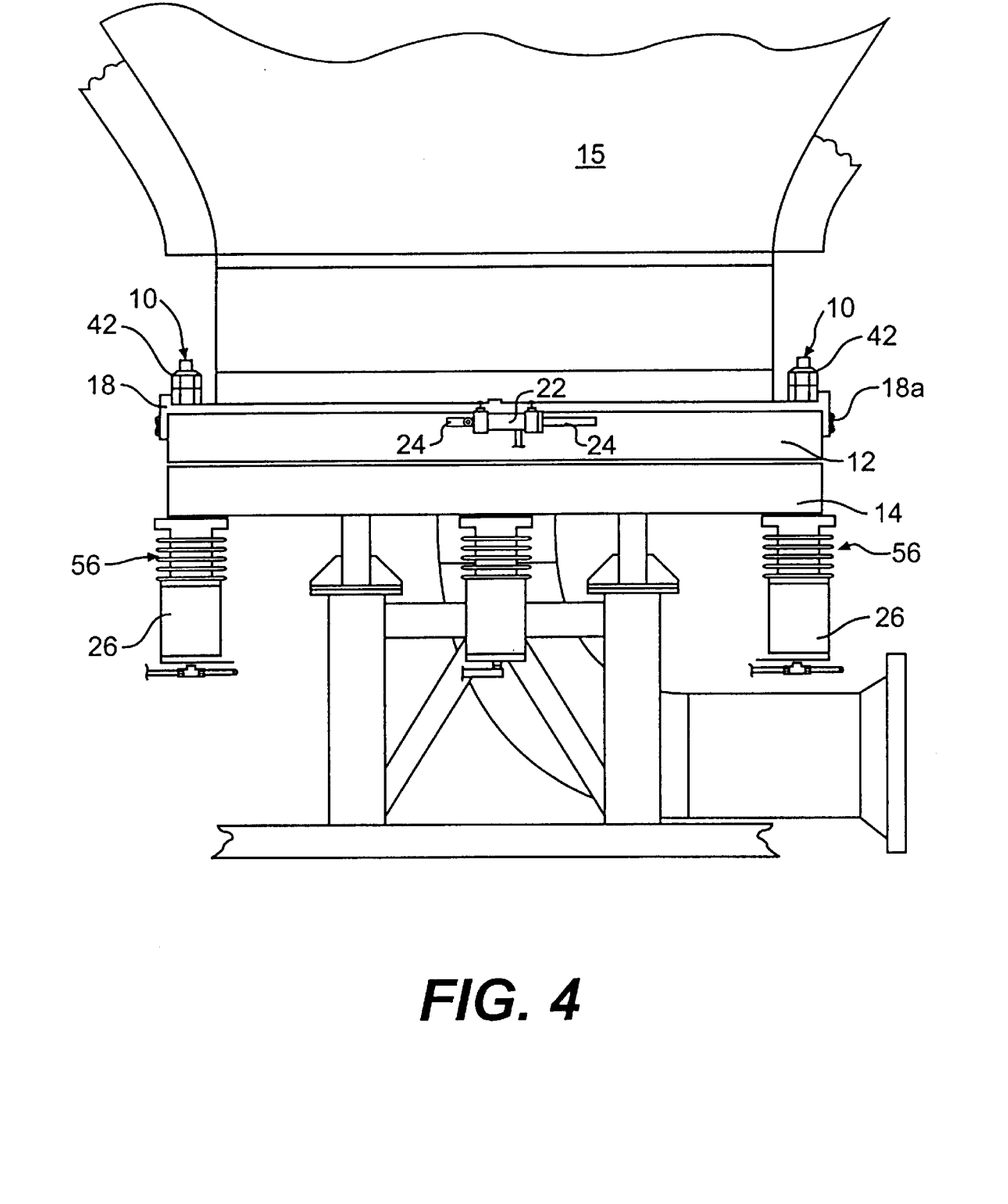
FIG. 4 is a side elevational view of the closure mechanisms and the lower portion of the coke drum shown in FIG. 3.
Figure 5:
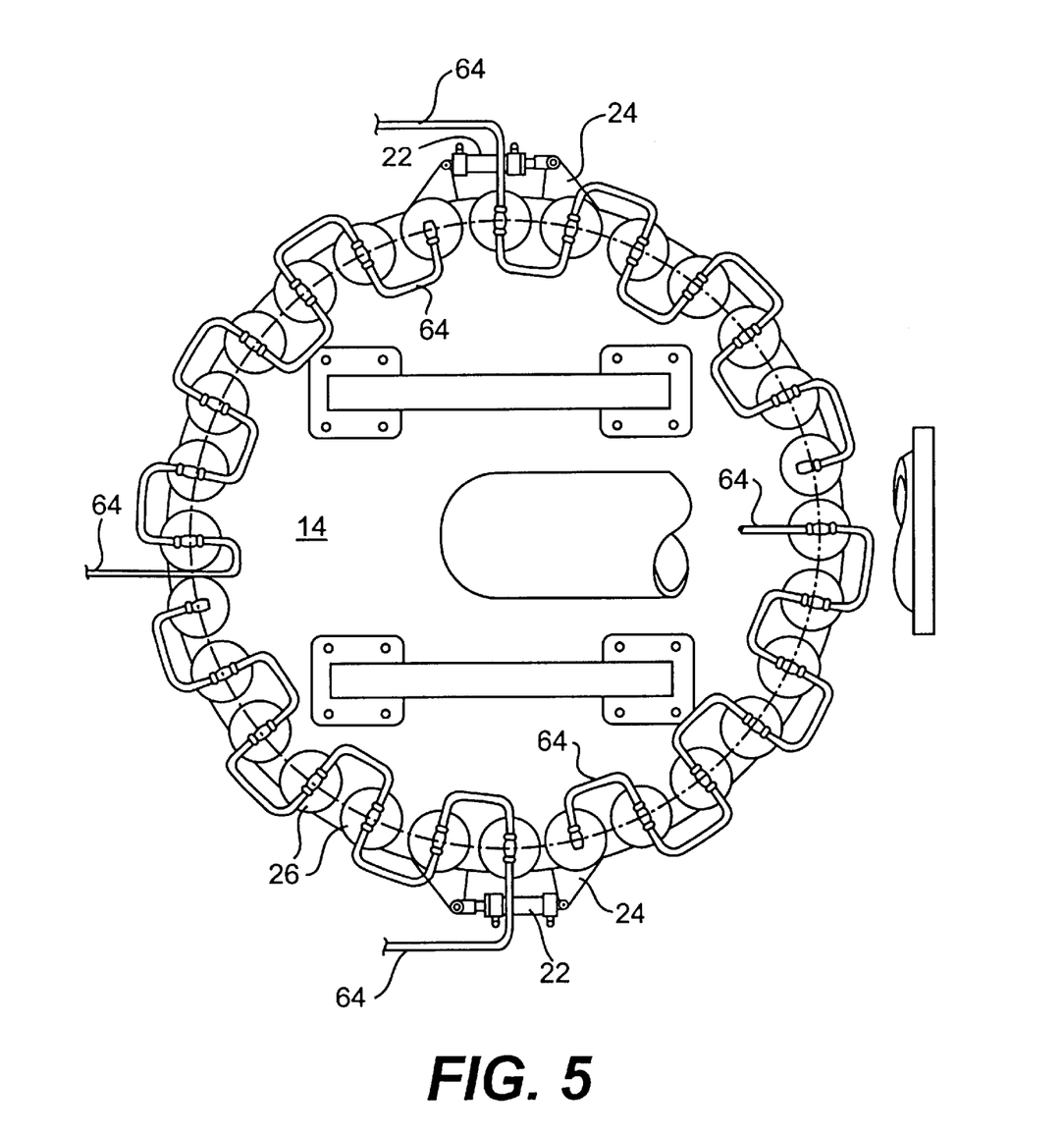
FIG. 5 is a bottom plan view of the closure mechanisms and coke drum shown in FIG. 3.

A plurality of such mechanisms 1 according to the present invention can be employed to provide, for example, a tight and secure seating of a blind cover to a flange of a coke drum. FIGS. 3–5 show such a blind cover 14 secured to the bottom of a coke drum 15 by a plurality of such mechanisms. FIG. 3 is a top schematic sectional view of the lower end of the coke drum. FIGS. 4 and 5 are, respectively, a side elevational view and a bottom plan view. FIG. 5 shows four hydraulic lines 64, each one leading to one-quarter of the inlet ports 32a of the outer hydraulic cylinders 26 that actuate the studs 10. Similar hydraulic lines feed the inlet ports 32b. These lines have been omitted from the drawing for the sake of clarity, but their configuration will be apparent to one of ordinary skill in the art. Because the outer hydraulic cylinders 26 are connected in series to the lines 64, there will be a slight delay between successive hydraulic cylinders 26 in the series. Increasing the number of lines 64, and therefore decreasing the number of hydraulic cylinders 26 per line, will minimize the cumulative effect of these delays and result in more synchronous operation of the hydraulic cylinders 26.

The flange 12 and the cover 14 each has a series of the openings 48a, 48b, respectively, which are aligned when the cover is in place over the flange. The anchor plate 18 has a matching series of the holes 20, each of which has a narrowed portion 44 and an enlarged portion 46, as discussed above. The narrowed portions 44 and the enlarged portions 46 are alternately alignable with the openings 48a, 48b. This arrangement can be used to remotely and selectively secure the flange 12 to the cover 14, and provides a full, bolted closure once engaged. This device can be combined with standard coke drum unheading equipment to enable simple, complete and remote removal of the coke drum bottom flange cover.

As best seen in FIG. 3, the anchor plate 18 of this embodiment is an annulus rotatable relative to the pressure vessel. The anchor plate 18 of the illustrated embodiment is moved circumferentially between the locking and unlocked positions. FIG. 3 shows the mechanism 1 with the anchor plate 18 in the locking position. The anchor plate 18 can ride directly on the flange 12 as shown, or can ride on bearings. Vertical guides 18a (FIG. 4) can be bolted to the periphery of either the plate 18 or the flange 12 to guide the plate 18 as it moves. This annular configuration is advantageous for the anchor plate 18, given a circular pressure vessel. However, the anchor plate 18 can take other shapes, and multiple anchor plates can be used around the perimeter of the vessel, rather than a single, annular plate. What is important is that the anchor plate 18 (or plates) be movable between a position in which the stud heads 42 lock behind it and a position in which the stud heads 42 can pass through it.

In the preferred embodiment, the anchor plate 18 is moved by at least one hydraulic cylinder 22. It is most preferred to use at least two such cylinders 22, evenly spaced about the periphery of the anchor plate, to rotate the anchor plate 18 in a smooth and reliable manner. In the illustrated embodiment, two (preferably bi-directional) hydraulic cylinders 22 are employed to drive the anchor plate 18 circumferentially. The cylinders 22 can be engaged to the anchor plate directly or by any suitable means, such as extensions 24, which extend from the anchor plate 18.

Once the anchor plate 18 is in the position illustrated in FIG. 3, the hydraulic pressure to the ports 32a of the cylinders 26 can be released, allowing the resilient member 16 to move the pistons 34 away from the flange 12 and the cover 14. As discussed above, the full force of the resilient member 16 then clamps the flange gasket 13 between the flange 12 and the cover 14. In addition, the resilient member 16 impart tension in the studs 10, keeping the flange and cover tightly clamped together and the junction free of leaks. Thus, no hydraulic pressure is necessary to maintain the closure. To release the stud tension and to open the closure, each outer cylinder 26 is pressurized via the port 32a and the anchor plate 18 is rotated so that the enlarged portions 46 of the holes 20 are aligned with the stud heads 42.

With the actuator plate 18 so oriented, the pressure via the ports 32a can be deactivated to permit the resilient member 16 to draw the stud heads 42 into the holes 20. The studs 10 can then be retracted by briefly introducing pressurized fluid through the ports 32b.

Figure 6:
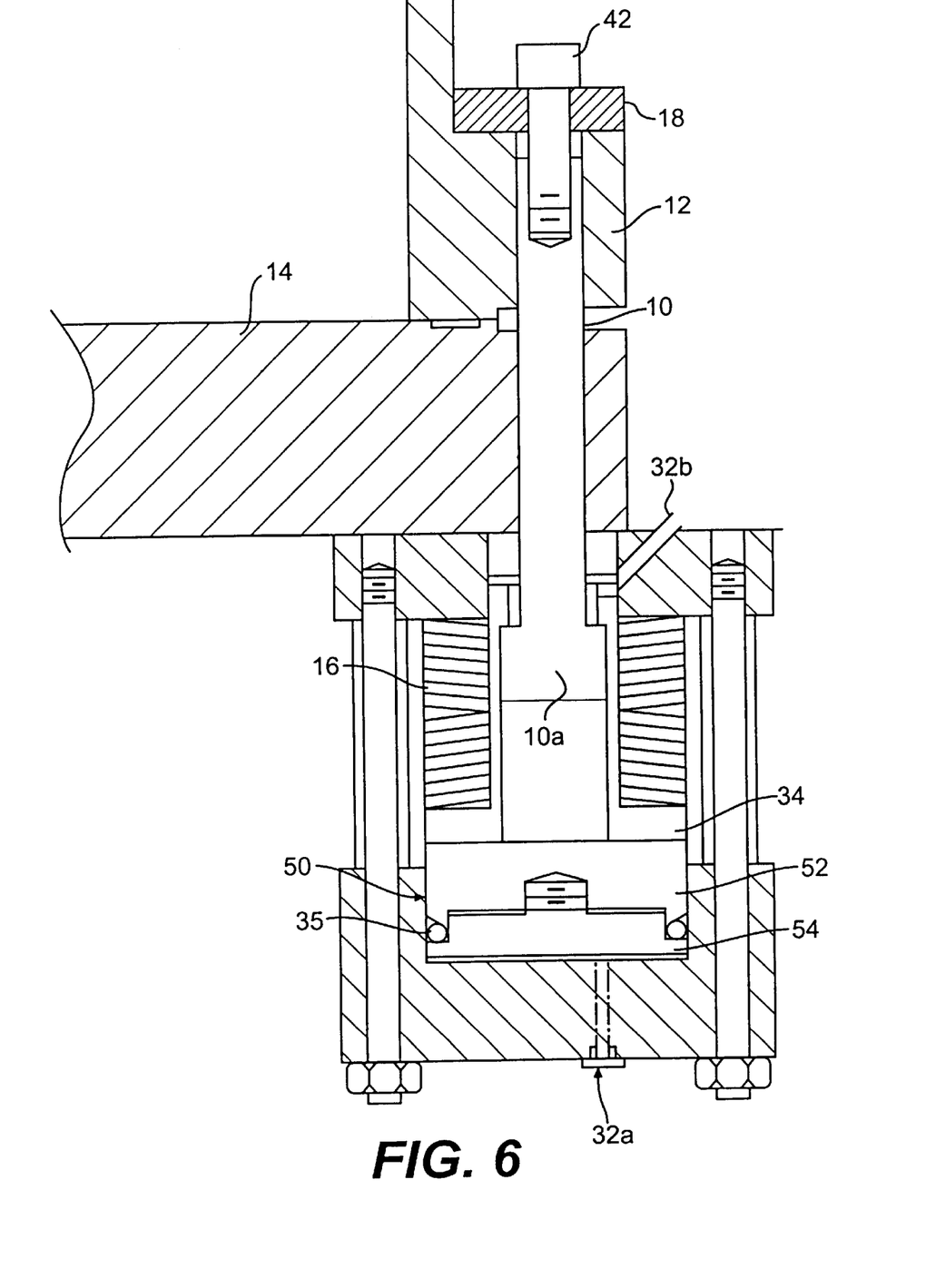
FIG. 6 is a schematic, elevational view in partial cross section of a closure mechanism according to another embodiment of the present invention.

In the embodiments illustrated in FIGS. 1A, 1B and 2, a separate piston-type actuator is employed for each stud 10. Hydraulic fluid is introduced to the outer cylinder 26 via lines connected to the ports 32a, 32b into the outer cylinder 26. In an alternate embodiment, illustrated in FIG. 6, a single piston actuator can be used to actuate at least two, and preferably all, of the pistons in either or each direction. For example, a piston actuator 50a can be annular to correspond to an annular anchor plate. In the illustrated embodiment, the piston actuator 50 is comprised of an upper piece 52 and a lower piece 54, with an O-ring 35 therebetween. Corresponding to each stud 10 are a separate piston 34 and a separate piston 10a. All of the pistons 34, 10a are preferably actuated simultaneously toward the extended position by the same annular piston actuator 50. (In FIG. 6, the common actuator for retracting each piston 10 via the port 32b has been omitted to simplify explanation.)

Figure 7A:
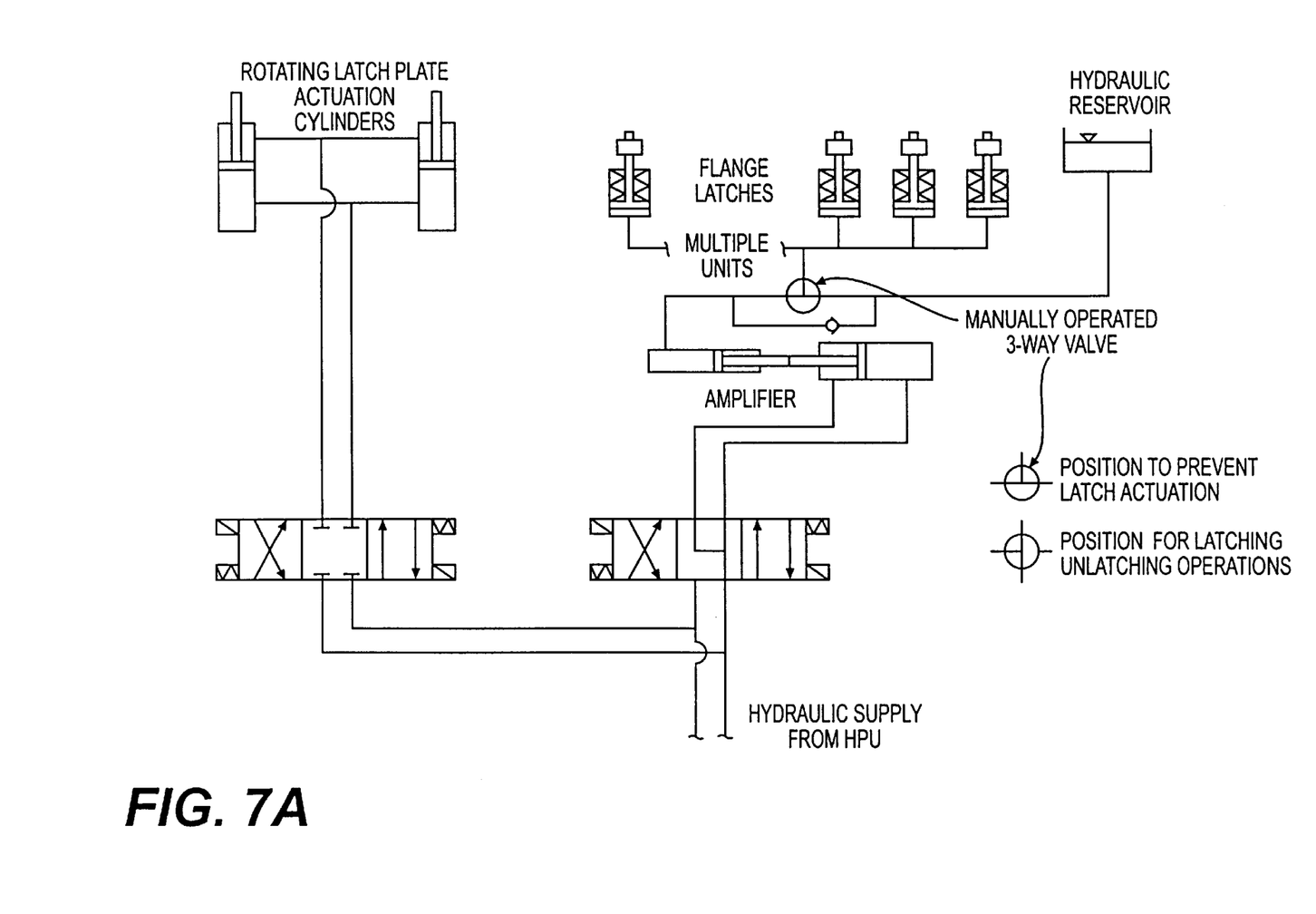
FIGS. 7A and 7B are schematic illustrations of a hydraulic control mechanism for use with a flange cover closure mechanism of the present invention.
Figure 7B:
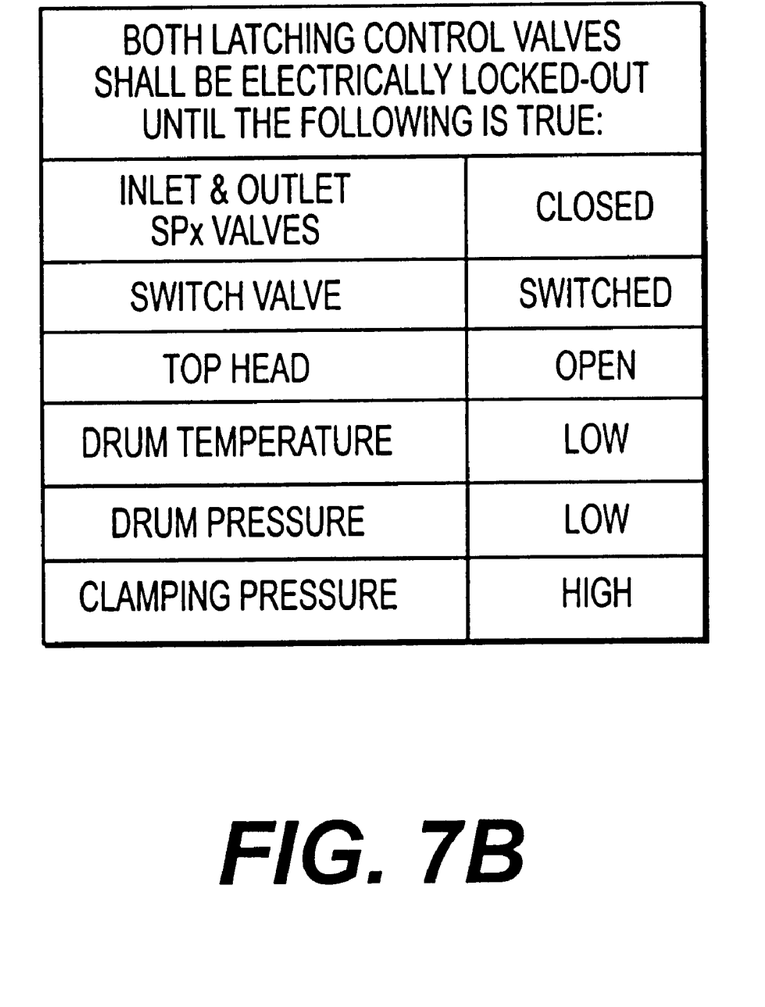

FIGS. 7A and 7B schematically illustrate one approach for utilizing conventional hydraulic equipment to control the fluid pressure needed to actuate the hydraulics of the inventive mechanism. In this approach, a single hydraulic power unit (HPU) and a single hydraulic reservoir are used to control the flow of pressurized fluid throughout the mechanism for a coke drum, in a manner well-known in the art. In a multi-drum delayed coker, the coke drums can each be taken off line individually in order to remove the coke from them. The table shown in FIG. 7B is one example of the control logic that can be used to enable and disable the entire mechanism. Isolation valves "SPx", not shown in FIG. 7A, are used to isolate the individual coke drums of the multi-drum delayed coking system so that they may be opened and the coke removed.

The control of the hydraulics should be designed so as to preclude the introduction of hydraulic fluid via port 32b when the narrowed portion 44 of the holes of the anchor plate 18 are aligned with the openings 48a, 48b. If the stud head is 42 locked behind the anchor plate 18 and tensioned by the resilient member 16, the introduction of hydraulic fluid via port 32b, which tends to bias the piston head 10a away from the cover, would unnecessarily increase the stress on the bolt 10.

The above-described arrangements are preferred because no hydraulic pressure is used to clamp the cover and flange together. Therefore, the vessel 15 will remain sealed even if the pressure in the hydraulics is lost. However, other, less preferred, embodiments fall within the scope of our invention. For example, the aspect of the invention whereby the piston head 10a can be selectively retracted or extended need not be utilized exclusively in connection with another piston in the manner described above. In one example, the stud 10 need not be slidable relative to the piston 34, but rather can be formed integrally with or affixed to the piston 34. The cylinder 26 can be configured to permit the piston 34 enough longitudinal play (away from the cover) to retract the stud 10 into the cover. In this arrangement, the piston 34 can be designed to completely disengage from the resilient member 16. Therefore, care should be taken to guard against the disorientation of the resilient member.

Figure 8A:
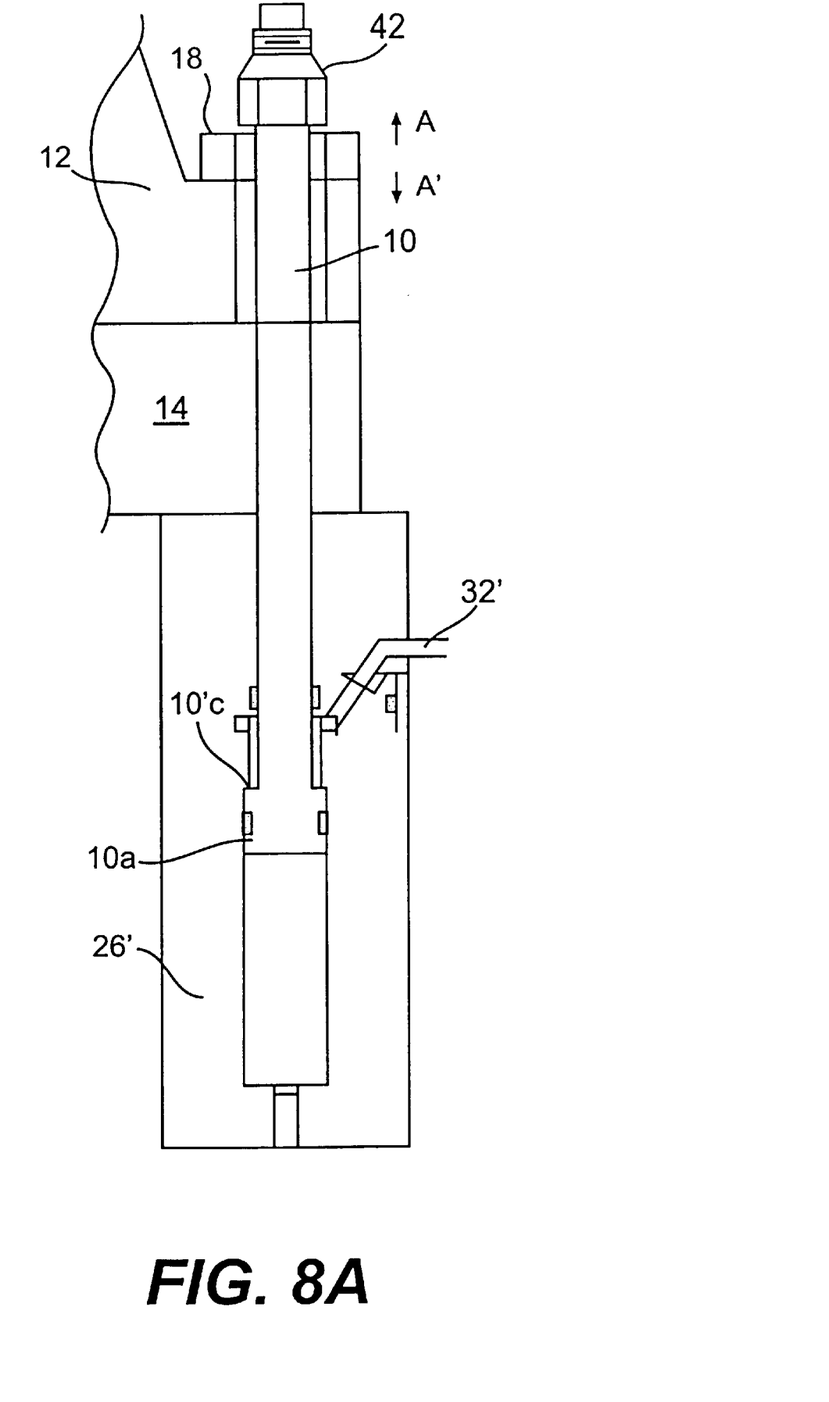
FIGS. 8A and 8B are schematic illustrations of alternate embodiments of the closure mechanism of the present invention.
Figure 8B:
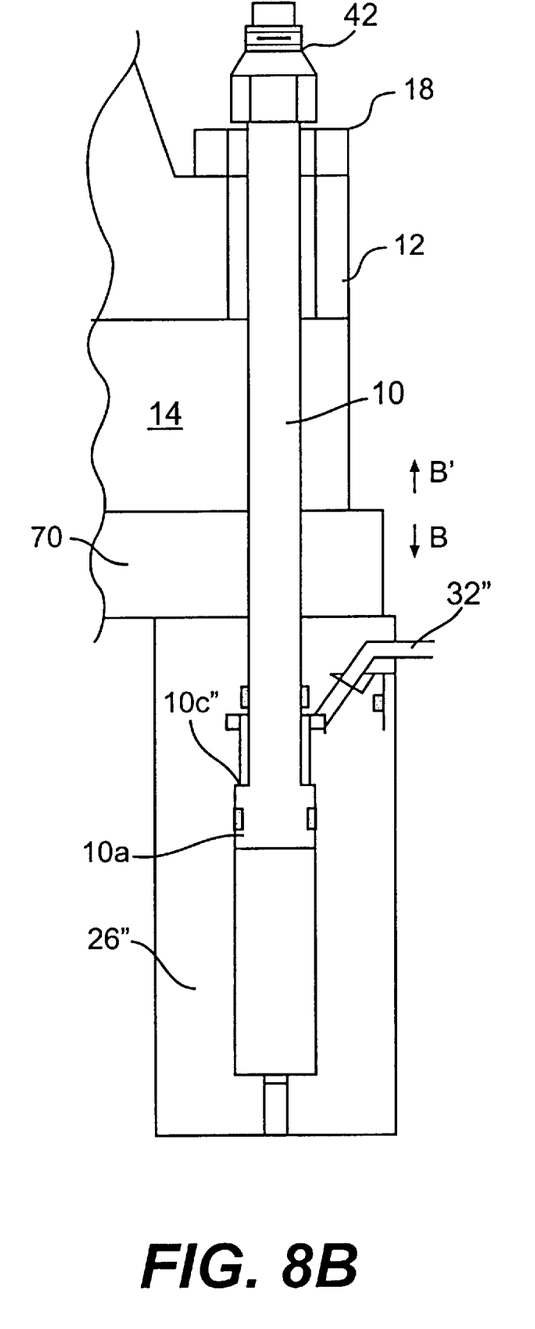

Two other examples are illustrated in FIGS. 8A and 8B. In FIG. 8A, the stud 10 (including the piston head 10a and stud head 42), flange 12, cover 14 and anchor plate 18 are configured in many respects just as they are in the above-described preferred embodiments. The piston head 10a is slidably mounted within a hydraulic cylinder 26', which is mounted to the cover 14. A shoulder 10c' within the cylinder 26' limits the motion of the piston head 10a in the direction toward the cover. Bias means such as hydraulic fluid or a compression spring, neither of which is illustrated, can be employed on the distal side of the piston head 10a to bias the piston head 10a toward the cover (as shown in FIG. 8A) to permit the anchor plate 18 to be rotated.

With this arrangement, pressurized fluid introduced via the port 32' can be used to either clamp the stud head 42 against the anchor plate 18 or to retract the stud head 42 through the flange 12. The position of the anchor plate 18 dictates which of these two operations occurs.

Alternatively, a mechanism can be employed to selectively bias the anchor plate 18 away from the flange (imparting relative force on the anchor plate and the flange in the directions indicated by arrows A and A', respectively). This can be accomplished by any of a number of mechanisms, such as a spring or hydraulic cylinder engaged with the anchor plate and the flange, or a pressure ring assembly like that shown in the Pechacek '384 patent, incorporated herein by reference.

In this arrangement, when the stud head 42 is locked behind the anchor plate 18, the anchor plate 18 can be biased in the direction A to clamp the cover and flange together. When the anchor plate 18 is oriented to permit the stud head 42 to pass therethrough, hydraulic fluid can be introduced via hydraulic port 32' to bias the piston head 10a away from the cover and retract the stud 10 into the cover.

In FIG. 8B, the stud 10 (including the piston head 10a and stud head 42), flange 12, cover 14 and anchor plate 18 are also configured in many respects just as they are in the above-described preferred embodiments. An additional locking plate 70, which can be selectively biased away from the cover (imparting relative force on the plate 70 and the cover in the directions indicated by arrows B and B', respectively), is provided on the opposite side of the cover and flange from the anchor plate 18. This locking plate movement can also be accomplished by any of a number of mechanisms, such as a spring, a hydraulic piston, or a pressure ring assembly like that shown in the Pechacek '384 patent. The piston head 10a is slidably mounted within a hydraulic cylinder 26", which is mounted to the locking plate 70. A shoulder 10c" within the cylinder 26" limits the motion of the piston head 10a in the direction toward the locking plate 70. Bias means such as hydraulic fluid or a compression spring, neither of which is shown in the figure, can be employed on the distal side of the piston head 10a to bias the piston head 10a toward the locking plate 70 (as shown in FIG. 8B) to permit the anchor plate 18 to be rotated.

When the stud head 42 is locked behind the anchor plate 18, the anchor plate 18 can be biased in the direction B to clamp the cover 14 and the flange 12 together. When the anchor plate 18 is oriented to permit the stud head 42 to pass therethrough, hydraulic fluid can be introduced via hydraulic port 32" to bias the piston head 10a away from the cover and retract the stud 10 into the cover.

While the present invention has been described with respect to what is at present considered to be the preferred embodiments, it should be understood that the invention is not limited to the disclosed embodiments. To the contrary, as exemplified above, the invention is intended to cover various modifications and equivalent arrangements included within the spirit and scope of the appended claims. For example, rather than employing hydraulic pressure to actuate the pistons 34 and/or move the anchor plate 18, various mechanical drive mechanisms can be used instead, as will be appreciated by those skilled in the art. Also, any of a number of well-known spring-type components can be used as the resilient member 16, rather than compressible spring washers. Additionally, the inventive closure mechanism can be employed in other environments, such as autoclaves or other pressure vessels. Therefore, the scope of the following claims is intended to be accorded the broadest reasonable interpretations so as to encompass all such modifications and equivalent structures and functions.

We claim:

1. A mechanism for selectively securing a cover to a flange of a pressure vessel, the cover and flange each having at least one opening therethrough, the respective openings being aligned when the cover is properly positioned facing the flange, the mechanism comprising:

a stud extending through the opening of one of the flange and the cover, the stud having a stud head at one end and a piston head at the other end, the stud head being sized to fit longitudinally through the opening of the other of the flange and the cover;

a selectively movable anchor plate disposed so that the other of the flange and the cover is disposed between the anchor plate and the one of the flange and the cover, the anchor plate having a hole through which the stud can extend when the cover is positioned facing the flange, the hole having (i) a wider portion through which the stud head can pass longitudinally and (ii) a narrower portion through which the stud head cannot pass longitudinally, the anchor plate being movable between a first position, in which the narrower portion of the hole is aligned with the openings of the cover and flange, and a second position, in which the wider portion of the hole is aligned with the openings of the cover and flange; and a cylinder in which the piston head is mounted so as to be slidable substantially normal to the one of the flange and the cover, the cylinder being mounted opposite to the cover and the flange from the anchor plate and including a mechanical stop that limits movement of the piston head relative to the cylinder in a direction toward the anchor plate, the cylinder being selectively movable relative to the anchor plate in a direction away from the anchor plate, when the anchor plate is in the first position and the piston head is against the mechanical stop, so as to draw the stud head against the anchor plate to clamp the cover and the flange together, and the piston head being selectively movable away from the mechanical stop, when the anchor plate is in the second position, so as to retract the stud head into the opening of the other of the flange and the cover.

2. The mechanism of claim 1, further comprising a piston in which the cylinder is formed.

3. The mechanism of claim 2, further comprising an outer cylinder in which the piston is slidably mounted.

4. The mechanism of claim 3, further comprising a pair of hydraulic fluid ports into the outer cylinder, the ports being located on opposite sides of the piston.

5. The mechanism of claim 2, further comprising a resilient member biasing the piston away from the one of the cover and the flange.

6. The mechanism of claim 5, wherein the resilient member is a spring washer adjacent to the piston and through which the stud extends, the spring washer being disposed so as to be compressed when the piston is forced toward the one of the cover and the flange.

7. The mechanism of claim 1, wherein the mechanical stop is formed at a constriction from a wider portion of the cylinder, in which the piston head is disposed, to a narrower portion of the cylinder, through which the stud extends.

8. A mechanism for selectively securing a cover to a flange of a pressure vessel, the cover and flange each having at least one opening therethrough, the respective openings being aligned when the cover is properly positioned facing the flange, the mechanism comprising:

a hydraulic cylinder mounted to one of the cover and the flange opposite from the other of the cover and the flange;

a piston mounted for slidable movement within the hydraulic cylinder in a direction substantially normal to the one of the cover and the flange, the piston having an axial bore aligned with the opening of the one of the cover and the flange and being movable between a locking position and an unlocking position, the locking position being farther from the one of the cover and the flange than is the unlocking position;

a stud extending through the opening of the one of the cover and the flange and having a stud head at one end and a piston head at the other end, the piston head being mounted for slidable movement within the axial bore of the piston between an extended position and a retracted position relative to the piston, the extended position being closer to the one of the cover and the flange than is the retracted position; and an anchor plate disposed opposite to the other of the cover and the flange from the cylinder, the anchor plate having a hole therethrough, the hole having a wider portion and a narrower portion, the wider portion being sized so that the stud head can pass therethrough, and the narrower portion being sized so that the stud head cannot pass therethrough, the anchor plate being movable relative to the other of the cover and the flange so that the wider and narrower portions of the hole are alternately alignable with the opening of the other of the cover and the flange, wherein, when the piston head is in the extended position, (i) the stud can extend through the openings of the cover and flange and through the hole of the anchor plate with the stud head spaced from the anchor plate if the piston is in the unlocking position, and (ii) the stud can extend through the openings of the cover and flange and through the hole of the anchor plate with the stud head clamped against the anchor plate if the piston is biased toward the locking position and the narrower portion of the hole is aligned with the opening of the flange.

9. The mechanism of claim 8, further comprising a mechanical stop disposed within the axial bore of the piston to prevent movement of the piston head toward the cover and the flange relative to the piston beyond the extended position.

10. The mechanism of claim 9, wherein the mechanical stop is formed at a constriction from a wider portion of the cylinder, in which the piston head is disposed, to a narrower portion of the cylinder, through which the stud extends.

11. The mechanism of claim 8, further comprising a resilient member biasing the piston toward the locking position.

12. The mechanism of claim 11, wherein the resilient member is a spring washer adjacent to the piston and through which the stud extends, the spring washer being disposed so as to be compressed when the piston is forced toward the unlocking position.

13. A The mechanism of claim 8, further comprising a pair of hydraulic fluid ports into the hydraulic cylinder, the ports being located on opposite sides of the piston.

14. A mechanism for selectively securing a cover to a flange of a pressure vessel, the cover and flange each having at least one opening therethrough, the openings being aligned when the cover is properly positioned facing the flange, the mechanism comprising:

an anchor plate movably disposed adjacent to one of the cover and the flange, the anchor plate having a hole therethrough, the hole having a wider portion and a narrower portion, the anchor plate being movable between a first position, in which the narrower portion of the hole is aligned with the openings of the cover and the flange, and a second position, in which the wider portion of the hole is aligned with the openings of the cover and the flange;

at least one piston secured to the other of the cover and the flange so as to be slidable in a direction substantially normal to the other of the cover and the flange in alignment with the opening therethrough;

a piston head mounted for slidable movement relative to the piston;

a stud extending from the piston head and through the opening of the other of the cover and the flange, the stud having a stud head remote from the piston head so that the stud head is positionable on an opposite side of the flange and the cover from the piston when the cover is in position facing the flange, the stud head being sized to fit longitudinally through the opening of the one of the cover and the flange and through the wider portion of the hole of the anchor plate, the stud head being sized not to fit longitudinally through the narrower portion of the hole of the anchor plate;

a resilient member biasing the piston away from the other of the cover and the flange so as to bias the stud head toward the one of the cover and the flange;

a first selectively activated actuator for overcoming the bias of the resilient member to force the piston toward the other of the cover and the flange and to force the piston head toward the other of the cover and the flange relative to the piston; and a second selectively activated actuator for biasing the piston head away from the other of the cover and the flange relative to the piston, wherein, with the anchor plate in the first position and the stud head opposite to the anchor plate from the piston, deactivating the first actuator permits the resilient member to bias the stud head against the anchor plate to clamp the cover and flange together, and with the anchor plate in the second position, deactivating the first actuator and activating the second actuator retracts the stud head through the wider portion of the anchor plate hole and into the opening of the one of the cover and the flange so that the cover and the flange can be separated.

15. The mechanism of claim 14, further comprising a stud-biasing hydraulic cylinder in which the piston is slidably mounted, wherein the first and second selectively activated actuators comprise means for introducing hydraulic fluid into the hydraulic cylinder on opposite sides of the piston.

16. The mechanism of claim 14, wherein the resilient member is a spring washer adjacent to the piston and through which the stud extends, the spring washer being disposed so as to be compressed when the piston is forced toward the other of the cover and the flange.

17. The mechanism of claim 14, further comprising a plate-positioning hydraulic cylinder secured to the anchor plate for selectively moving the anchor plate between the first and second positions.

18. The mechanism of claim 14, wherein the cover and the flange have matching pluralities of the openings, the anchor plate has a corresponding plurality of the holes, and the mechanism comprises a corresponding plurality of the studs.

19. The mechanism of claim 18, wherein the mechanism comprises a plurality of the pistons, each of the studs being secured to a different one of the pistons.

20. The mechanism of claim 19, wherein at least one of the selectively activated actuators includes a piston actuator that simultaneously engages more than one of the pistons.

21. The mechanism of claim 20, wherein the anchor plate and the piston actuator are substantially annular, and the piston actuator simultaneously engages all of the plural pistons.

22. The mechanism of claim 14, wherein the anchor plate is substantially annular and rotatable circumferentially relative the pressure vessel between the first and second positions.

23. A mechanism for selectively securing a cover to a flange of a pressure vessel, the cover and flange each having at least one opening therethrough, the respective openings being aligned when the cover is properly positioned facing the flange, the mechanism comprising:

a stud extending through the opening of one of the cover and the flange, the stud having a stud head at one end and a piston head at the other end, the stud head being sized to fit longitudinally through the opening of other of the cover and flange;

at least one piston mounted to the one of the cover and flange for slidable movement in a direction substantially normal to the one of the cover and flange, the piston head of the stud being mounted for slidable movement within the piston in the direction of the movement of the piston, the stud head and the piston being positionable on opposite sides of the cover and flange when the cover is positioned facing the flange;

an anchor plate disposed opposite to the cover and flange from the piston and having a hole therethrough into which the stud can extend when the cover is positioned facing the flange, the hole having (i) a wider portion through which the stud head can pass longitudinally and (ii) a narrower portion through which the stud head cannot pass longitudinally, the anchor plate being movable between a first position, in which the narrower portion of the hole is aligned with the openings of the cover and flange, and a second position, in which the wider portion of the hole is aligned with the openings of the cover and flange;

a resilient member biasing the piston away from the cover and flange;

a first selectively activated actuator for overcoming the bias of the resilient member to force the piston toward the cover and flange and to force the piston head toward the cover and flange relative to the piston; and a second selectively activated actuator for biasing the piston head away from the cover and flange relative to the piston, wherein, when the anchor plate is in the first position, deactivating the first actuator permits the resilient member to bias the stud head against the anchor plate to clamp the cover and flange together, and when the anchor plate is in the second position, deactivating the first actuator and activating the second actuator draws the stud head through the wider portion of the anchor plate hole and into the opening of the other of the cover and flange so that the cover and flange can be separated.

24. The mechanism of claim 23, further comprising a stud-biasing hydraulic cylinder in which the piston is slidably mounted, wherein the first and second selectively activated actuators comprise means for introducing hydraulic fluid into the hydraulic cylinder on opposite sides of the piston.

25. The mechanism of claim 23, wherein the resilient member comprises a spring washer adjacent to the piston and through which the stud extends, the spring washer being disposed so as to be compressed when the piston is forced toward the cover and flange.

26. The mechanism of claim 23, wherein the anchor plate is substantially annular and rotatable circumferentially relative to the pressure vessel between the first and second positions.

27. The mechanism of claim 23, further comprising a plate-positioning hydraulic cylinder secured to the anchor plate for selectively moving the anchor plate between the first and second positions.

28. The mechanism of claim 23, wherein the cover and the flange have matching pluralities of the openings, the anchor plate has a corresponding plurality of the holes, and the mechanism comprises a corresponding plurality of the studs.

29. The mechanism of claim 28, wherein the mechanism comprises a plurality of the pistons, each of the studs being secured to a different one of the pistons.

30. The mechanism of claim 29, wherein at least one of the selectively activated actuators includes a piston actuator that simultaneously engages more than one of the pistons.

31. The mechanism of claim 30, wherein the pressure vessel and the cover are each substantially circular in cross section, the flange and the anchor plate are each substantially annular, the openings, the holes and the studs are distributed around the periphery of the pressure vessel, and the piston actuator is substantially annular and simultaneously engages all of the pistons.

\* \* \* \* \*